United States Patent
Stiepel et al.

(10) Patent No.: US 6,652,164 B2
(45) Date of Patent: Nov. 25, 2003

(54) RETRACTABLE CAMERA MOUNTING MECHANISM

(75) Inventors: Norbert Stiepel, Chapel Hill, NC (US); Terrence Traser, Clovis, CA (US)

(73) Assignee: Pelco, Clovis, CA (US)

( * ) Notice: Subject to any disclaimer, the term of this patent is extended or adjusted under 35 U.S.C. 154(b) by 16 days.

(21) Appl. No.: 10/112,310

(22) Filed: Mar. 28, 2002

(65) Prior Publication Data

US 2003/0185556 A1 Oct. 2, 2003

(51) Int. Cl.[7] .............................................. G03B 17/00
(52) U.S. Cl. ........................ 396/427; 348/143; 348/150; 348/151
(58) Field of Search ................................ 396/419, 427, 396/428; 348/143, 150, 151, 152

(56) References Cited

U.S. PATENT DOCUMENTS

| | | | | | |
|---|---|---|---|---|---|
| 3,638,502 | A | * | 2/1972 | Leavitt et al. | 74/5.34 |
| 3,720,147 | A | * | 3/1973 | Bemis | 396/427 |
| 3,732,368 | A | * | 5/1973 | Mahlab | 348/151 |
| 3,739,703 | A | * | 6/1973 | Behles | 396/427 |
| 4,080,629 | A | * | 3/1978 | Hammond et al. | 348/373 |
| 4,160,999 | A | * | 7/1979 | Claggett | 348/151 |
| 4,217,606 | A | * | 8/1980 | Nordmann | 348/151 |
| 4,414,576 | A | * | 11/1983 | Randmae | 348/373 |
| 4,652,104 | A | * | 3/1987 | Harvey | 396/318 |
| 4,657,351 | A | * | 4/1987 | Mori | 359/687 |
| 4,736,218 | A | * | 4/1988 | Kutman | 396/427 |
| 4,764,008 | A | * | 8/1988 | Wren | 396/427 |
| 4,833,534 | A | * | 5/1989 | Paff et al. | 348/151 |
| 4,901,146 | A | * | 2/1990 | Struhs et al. | 348/151 |
| 4,920,367 | A | * | 4/1990 | Pagano | 396/427 |
| 4,944,030 | A | * | 7/1990 | Haraguchi et al. | 396/62 |
| 4,972,633 | A | * | 11/1990 | Wright | 52/27 |
| 4,978,984 | A | * | 12/1990 | Brookfield | 396/427 |
| 4,984,089 | A | * | 1/1991 | Stiepel et al. | 348/143 |
| 5,028,997 | A | * | 7/1991 | Elberbaum | 348/143 |
| 5,111,288 | A | * | 5/1992 | Blackshear | 348/143 |
| 5,121,215 | A | * | 6/1992 | Boers et al. | 348/373 |
| 5,181,120 | A | * | 1/1993 | Hickey et al. | 348/373 |
| 5,223,872 | A | * | 6/1993 | Stiepel et al. | 396/427 |
| 5,394,184 | A | * | 2/1995 | Anderson et al. | 348/151 |
| 5,394,209 | A | * | 2/1995 | Stiepel et al. | 396/20 |
| 5,418,567 | A | * | 5/1995 | Boers et al. | 348/375 |
| 5,627,616 | A | * | 5/1997 | Sergeant et al. | 396/427 |
| 5,630,663 | A | * | 5/1997 | Ling et al. | 362/365 |
| 5,689,304 | A | * | 11/1997 | Jones et al. | 348/373 |
| 5,768,647 | A | * | 6/1998 | Coffin et al. | 396/428 |
| 5,768,648 | A | * | 6/1998 | Skipp et al. | 396/428 |
| 5,818,519 | A | * | 10/1998 | Wren | 348/151 |
| 5,850,579 | A | * | 12/1998 | Melby et al. | 396/427 |
| 5,852,754 | A | * | 12/1998 | Schneider | 396/427 |
| 5,931,432 | A | * | 8/1999 | Herold et al. | 248/343 |
| 5,966,551 | A | * | 10/1999 | Haraguchi et al. | 396/84 |
| 5,966,991 | A | * | 10/1999 | Gosselin et al. | 74/490.1 |
| 6,019,524 | A | * | 2/2000 | Arbuckle | 396/427 |
| 6,027,257 | A | * | 2/2000 | Richards et al. | 396/428 |
| 6,234,691 | B1 | * | 5/2001 | Jones et al. | 396/427 |
| 6,333,759 | B1 | * | 12/2001 | Mazzilli | 348/148 |

* cited by examiner

*Primary Examiner*—David Gray
(74) *Attorney, Agent, or Firm*—Mark D. Miller (57) ABSTRACT

A viewing angle-dependent retractable surveillance camera mounting mechanism allowing for pivotal movement of the camera (tilt and retraction capability) fully up into the interior of the housing; and correlation of the camera tilt/retraction angle to the lens telephoto angle and zoom in order to provide a consistent view. A protective cover and a fixed or movable dome bubble may be provided with the camera mounting mechanism.

10 Claims, 11 Drawing Sheets

RETRACTABLE CAMERA MOUNTING MECHANISM

BACKGROUND OF THE INVENTION

1. Field of the Invention

The present invention relates to surveillance camera systems, and more particularly to a mounting apparatus for a surveillance camera that allows the camera to be fully retracted into a housing behind the plane of the surface that the mounting apparatus is attached to.

2. Description of the Prior Art

The use of surveillance cameras and related systems is becoming increasingly more prevalent. Not only are surveillance cameras used in such traditional institutions as banks and casinos, but their use has spread to retail and business establishments, indoor and outdoor entry points, airport security checkpoints, government buildings, and the like. One of the most common mounting locations for a security camera is in a ceiling. From the vantage point of a ceiling, a camera may be pointed (the tilt angle) anywhere from parallel with the ceiling itself to straight down. When the camera is pointed parallel with the ceiling, the front lens of the camera is perpendicular to the ceiling having a 90° tilt. When pointed straight down, the front lens of the camera is parallel to the ceiling having a 0° tilt. Then, once the tilt angle is selected, a ceiling-mounted camera may scan (pan) through a full 360° circle.

Numerous wall and ceiling mounted surveillance camera support devices have been developed in the prior art. One common mounting apparatus is a simple rotatable structure that is attached directly to the surface of the ceiling or wall, leaving the camera and mount in plain view. Often such mounting apparatuses are enclosed within a semi-spherical or spherical dome or other similar structure to disguise or conceal the camera, while also protecting it against the environment and potential vandalism.

In many installations, a housing (back box) is provided in the wall or ceiling directly behind (above) the camera to house the motors and other electronics which operate the camera. Often, the pan and tilt camera mountings have the camera tilt angle passing through the approximate center of inertia of the combination camera body and lens, for the specific purpose of reducing inertial forces during camera tilt movement. In order for such cameras to have a full 90° tilt capability (i.e., to be able to view the ceiling line), the entire camera and lens arrangement has to be capable of being tilted down below the plane of the ceiling line. As a result, in many cases the entire camera body and lens assembly is mounted inside a semi-spherical viewing dome that protrudes below the ceiling line, as opposed to inside the housing above the ceiling line.

In a typical ceiling application, it is important for the camera to be able to pan and tilt in order to train on various objects, but usually the most critical viewing area is the conical region immediately below the camera. While viewing this "default" area, it is desirable for the camera and lens assembly to be fully retractable into the housing and not protrude beyond the plane of the ceiling so as not to be detected by a potential intruder. A dome or camera protruding down from the ceiling is easily spotted from a distance by an intruder and may potentially be avoided. However, a retracted camera has the same appearance as an opening for a light fixture, and is not as easily detected allowing for more covert surveillance. Such a configuration also protects the camera from environmental changes and potential vandalism, is less intrusive and is more aesthetically pleasing in appearance.

Several existing camera mounting apparatuses allow for the camera and lens assembly to be partially retracted into the housing. However, it has heretofore been impossible or impracticable to provide a mounting apparatus that is capable of fully retracting the camera and lens assembly into the housing while maintaining the ability to tilt all the way up to the ceiling (0°). The present invention provides such a mounting apparatus in which the camera and lens assembly is capable of viewing along the ceiling line and is also fully-retractable into the housing.

SUMMARY OF THE INVENTION

The present invention provides a viewing angle-dependent retractable camera mechanism invention having two aspects. The first aspect is that of the camera (body and lens) being mounted for pivotal movement (tilt) fully up into the interior of the housing (back box). In the retractable camera mechanism of the present invention, the hinge point (tilt pivot point) for the camera mount is located adjacent a circumferential interior edge of the housing, so that the pivot point of the camera is located within the housing, above the ceiling line. This allows the camera body and lens assembly may be fully retracted up into the housing for more covert operations. The corresponding pivot point on the camera body is near the front lens, as opposed to being at or near the center of the camera body. The camera mount can pivot 90° downwardly to effect the full range of camera tilt, from parallel to the ceiling line to straight down. The purpose of this design, of course, is to permit the entire camera and lens assembly to be pivoted up into the interior of the housing utilizing one motor for both retraction and tilt.

The second aspect of this invention is that of correlating the camera tilt/retraction angle to the camera lens telephoto angle. Specifically, telephoto angles may vary from a wide angle of approximately 75° to a telephoto angle of approximately 3° as the camera "view" is zoomed to and from telephoto. Therefore, at any given tilt/retraction angle, the actual camera "view" changes as the zoom/telephoto angle changes. Stated differently, for each level of zoom of the telephoto lens, the tilt angle of the camera may be adjusted so that one edge of the viewing field along the plane of the surface upon which the camera is mounted (e.g. a wall or ceiling line) remains constant as the lens zooms in and out.

As an example, for a selected wide viewing angle of the camera lens, the camera need not be tilted down out of the housing to a full 90°, but rather need be tilted downwardly only, for example, approximately 60° in order to have one edge of the camera view remain along the ceiling line, the amount of tilt depending on the capability of the lens. Similarly, with the camera lens at a maximum telephoto position having, for example, a minimum viewing angle of 3°, such a camera would need to be tilted out of the housing approximately 87° in order to keep one edge of the view along the ceiling line, as is intended in pan and tilt camera mounts. The amount of tilt in each situation will depend upon the characteristics and capabilities of the particular lens. In outdoor applications, viewing along the ceiling line is more common because there tend to be long unobstructed views. However, even in indoor applications, a large ceiling area may have few or no protrusions whatsoever, giving the impression that no surveillance is taking place when, in fact, there may be significant surveillance conducted using numerous cameras installed in retractable housing assemblies of the type described herein.

Of course, should the need arise for the camera to focus on a particular object or area, it may then be tilted out from the housing in the ceiling (or wall) for this purpose. In particular, when the camera lens is in telephoto mode, the camera may extend out from the housing in the ceiling a maximum amount. However, when the camera lens is in wide-angle mode, the camera may only be extended from the back box a minimum amount. In both cases, the amount or degree of camera tilt needed is determined based on the capability of the particular lens and the amount of zoom sought. The camera position is thereafter established and maintained so that one edge of the camera view remains parallel to the surface upon which it is mounted (e.g. the upper edge of the view continues to be the ceiling line as the camera zooms in and out).

The camera and lens assembly is pivotally attached to a pair of movable axes that make up the mount of the present invention. These axes are deployed in the housing. The camera may be provided with or without a shallow hemispheric viewing dome. Such a dome, if provided, may be either stationary at the location of deployment, or attached to the housing for travel with the camera mount. Alternatively, or additionally, the back box may be provided with a cover made of neoprene, urethane or other similar material through which the camera and camera mount pass as the camera is tilted (downwardly) out of the housing. Such a neoprene screen could have a flexible opening to minimize the physical exposure of the camera, and the camera module could be contoured to blend with the flexible covering. Such a cover would also serve as a dust cover and/or as a visibility cover to hide the camera and the pan and tilt mechanism from view. Ideally, such a cover should be the same color as the ceiling, housing and camera to minimize detection.

Accordingly, the present viewing angle-dependent retractable camera mechanism invention has the advantages of: (1) mounting the camera and lens assembly for pivotal movement (tilt and retraction capability) fully up into the interior of the housing; and (2) correlating the camera tilt/retraction angle to the lens telephoto angle and zoom in order to provide a consistent view that does not include the surface to which the camera is attached (e.g. the ceiling), but may limit the tilt angle to align the camera "view" with the ceiling line. In addition, a fixed or movable dome bubble may be provided with the camera.

It is therefore a primary object of the present invention to provide an adjustable support mechanism for a camera and lens assembly deployed in a planar mounted housing that allows the camera and lens assembly to be fully retracted into the housing.

It is also an important object of the present invention to provide an adjustable support mechanism for a camera and lens assembly deployed in a planar mounted housing that allows the camera to view along the plane of the planar surface to which the housing is attached.

It is another a primary object of the present invention to provide an adjustable support mechanism for a camera and lens assembly deployed in a planar mounted housing in which the camera tilt angle is adjusted and correlated according to the viewing angle of the lens.

It is another important object of the present invention to provide an adjustable support mechanism for a camera and lens assembly deployed in a planar mounted housing in which the camera tilt angle is adjusted and correlated according to the telephoto capability of the lens.

It is a further object of the present invention to provide a mounting apparatus for a surveillance camera that allows the camera to be fully retracted in order to avoid detection in covert surveillance operations.

It is a further object of the present invention to provide a fully retractable mounting assembly for a surveillance camera together with a cover over the camera opening to protect the camera from dust and other environmental conditions, and to further prevent detection of the camera.

It is another object of the present invention to provide a fixed dome bubble over the opening in a retractable camera support assembly. It is another object of the present invention to provide a movable dome bubble that moves with the camera mounted in a retractable camera support assembly.

Additional objects of the invention will be apparent from the detailed descriptions and the claims herein.

DETAILED DESCRIPTION OF A PREFERRED EMBODIMENT

The mounting apparatus of the present invention will be described herein with reference to a ceiling-mounted environment. However, it is to be understood that the present invention may be used to support a surveillance camera mounted on any planar surface including, without limitation, a wall or floor.

Figure 1:
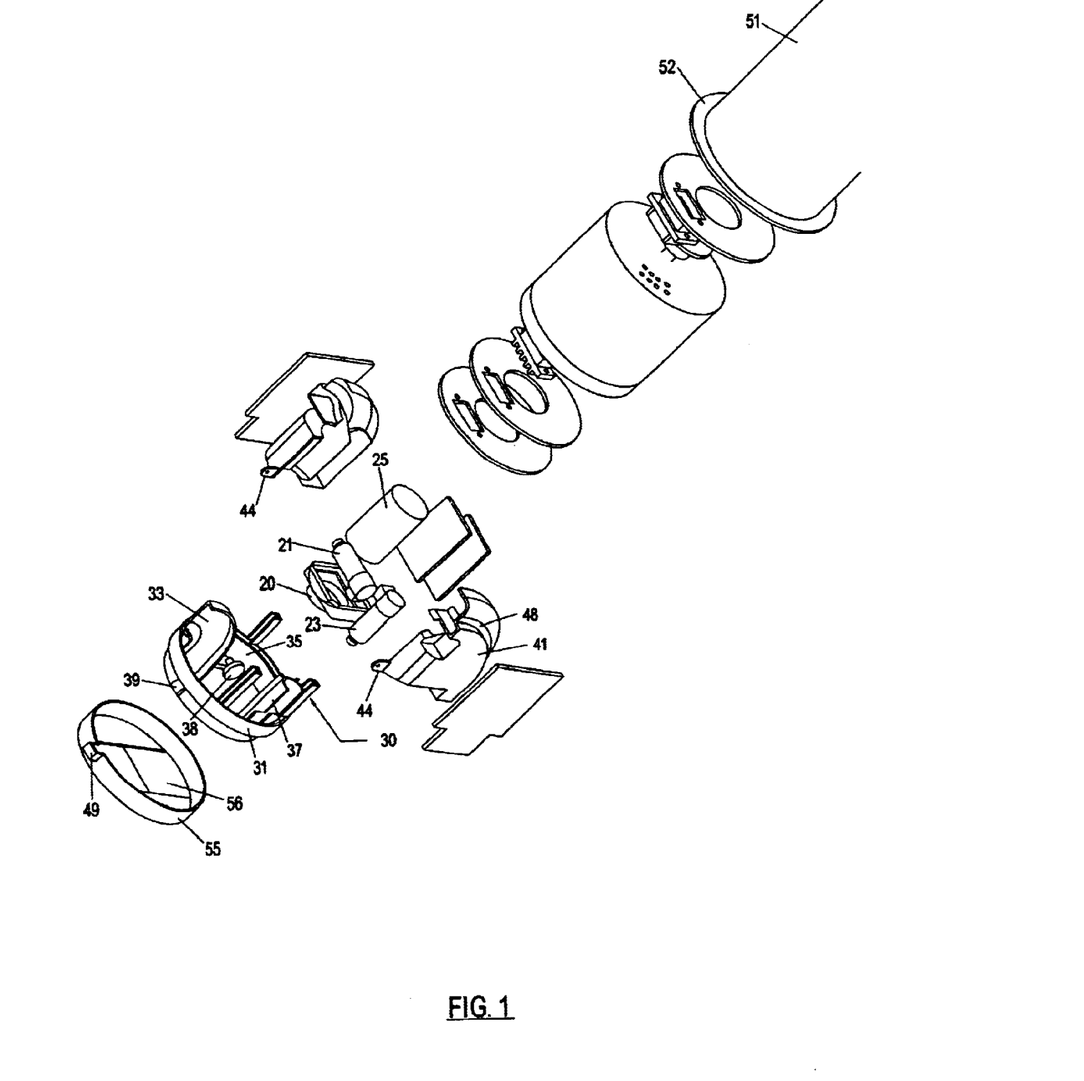
FIG. 1 is an exploded view of the present invention.
Figure 2:
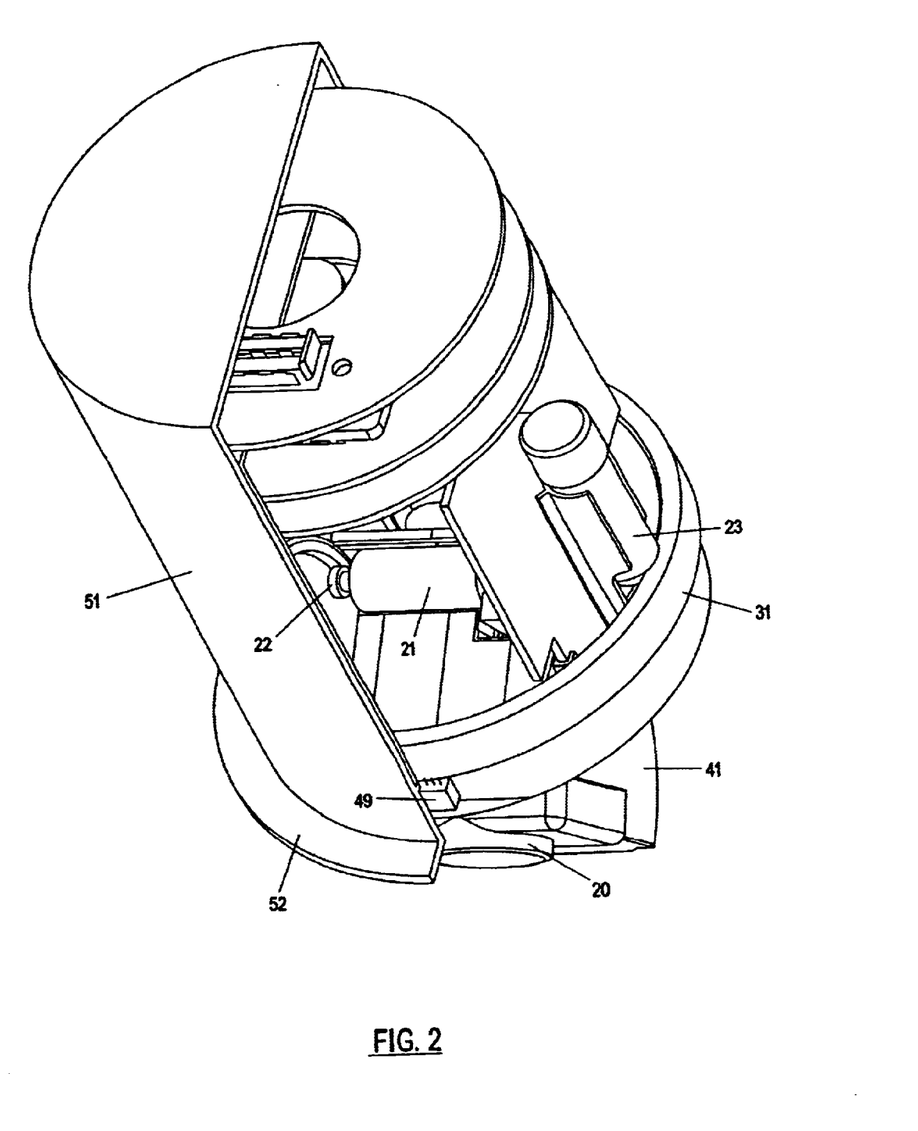
FIG. 2 is a partially cut away back perspective view of the present invention.

Turning to the drawings wherein like reference characters designate the same structure throughout the several views, and referring particularly to FIGS. 1 and 2, it is seen that the mounting apparatus of the present invention includes a cylindrical hollow housing or back box 51 with a peripheral flange 52 at its open end for attachment to a planar surface such as a wall or ceiling. An annular bracket 31 having many features detailed below is provided for rotatable attachment inside the open end of housing 51. A housing having two sides 41 and a front 20 is provided inside box 51 to enclose a camera 25. An optional cover 55 having flexible opening flaps 56 may be provided for attachment to annular bracket 31. A first motor 21 is provided for imparting tilt motion to the camera housing (the tilt motor 21), and a second motor 23 is provided for imparting rotational movement to the camera housing in order to scan (the pan motor 23).

Figure 2A:
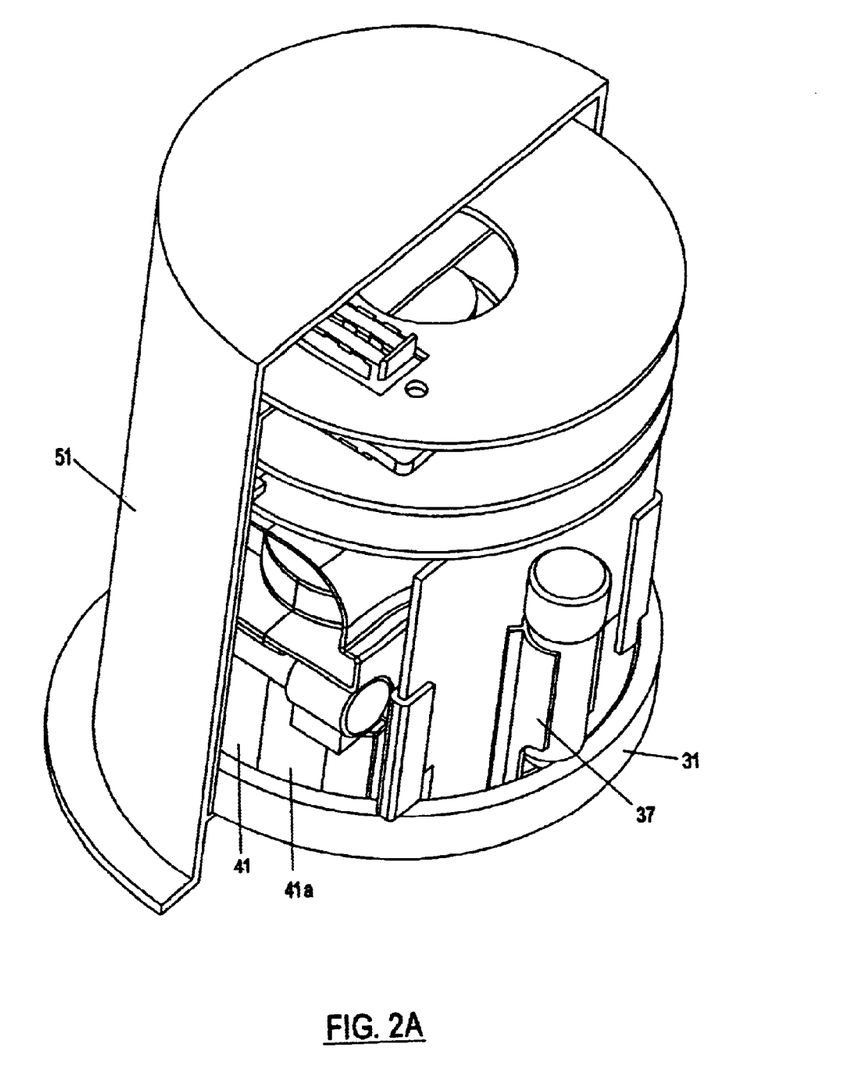
FIG. 2A is a partially cut away front perspective view of the present invention.
Figure 3:
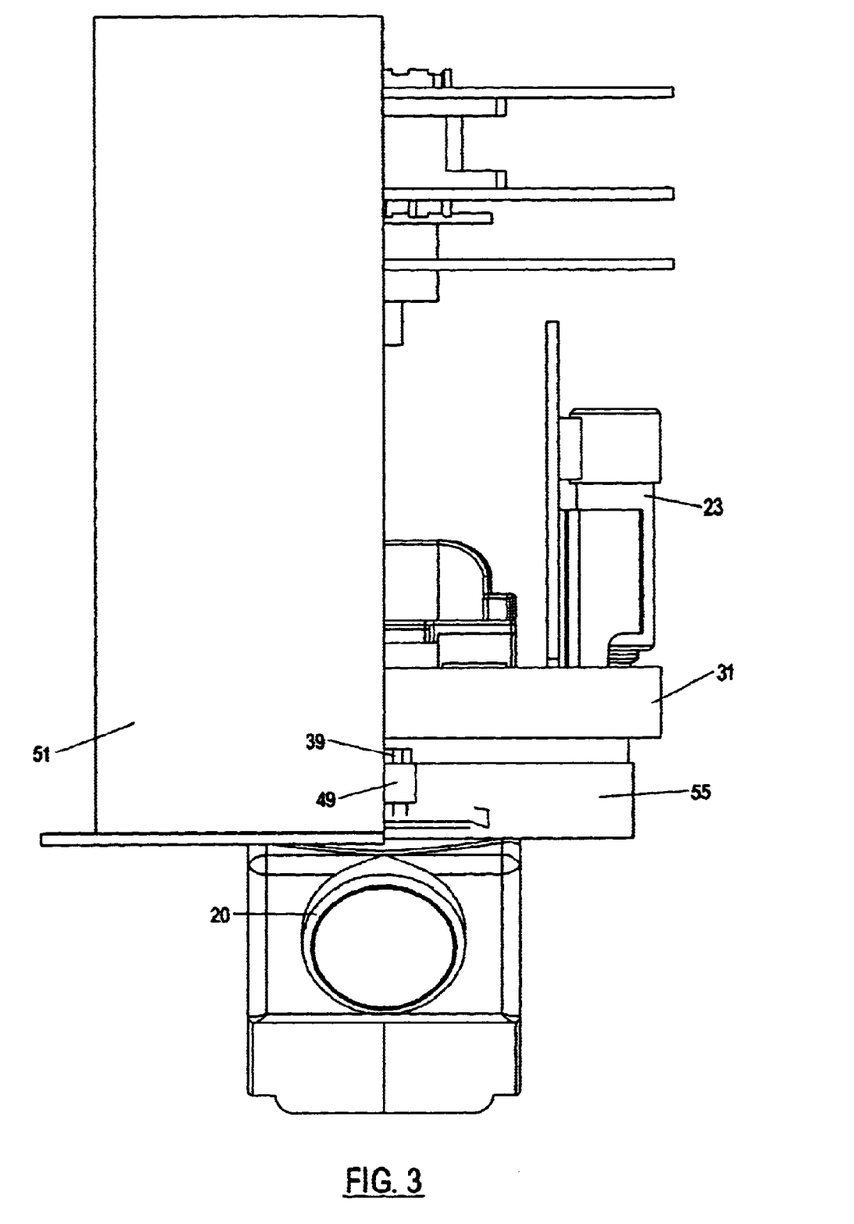
FIG. 3 is a partially cut away front view of the present invention.
Figure 4:
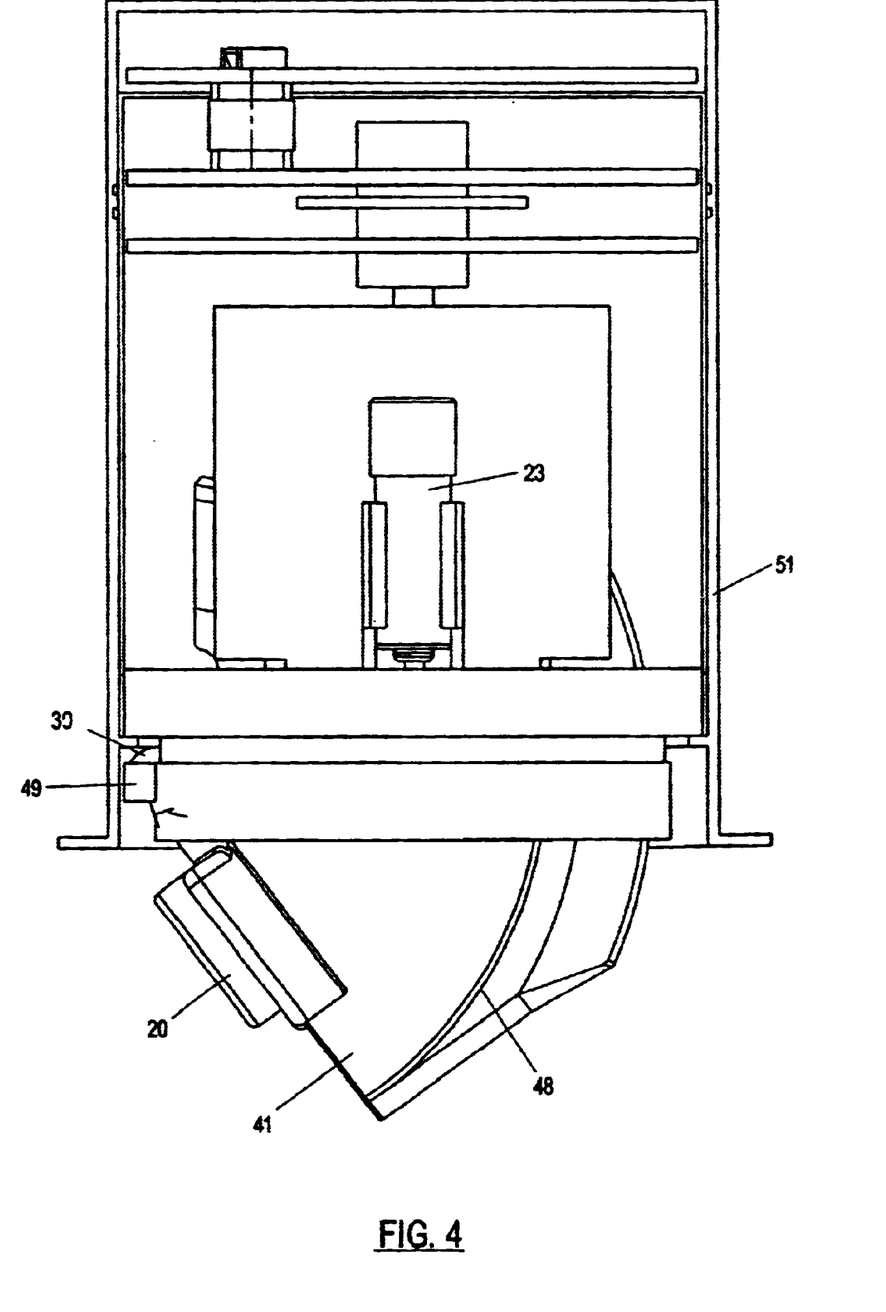
FIG. 4 is a partially cut away side view of the present invention.
Figure 5:
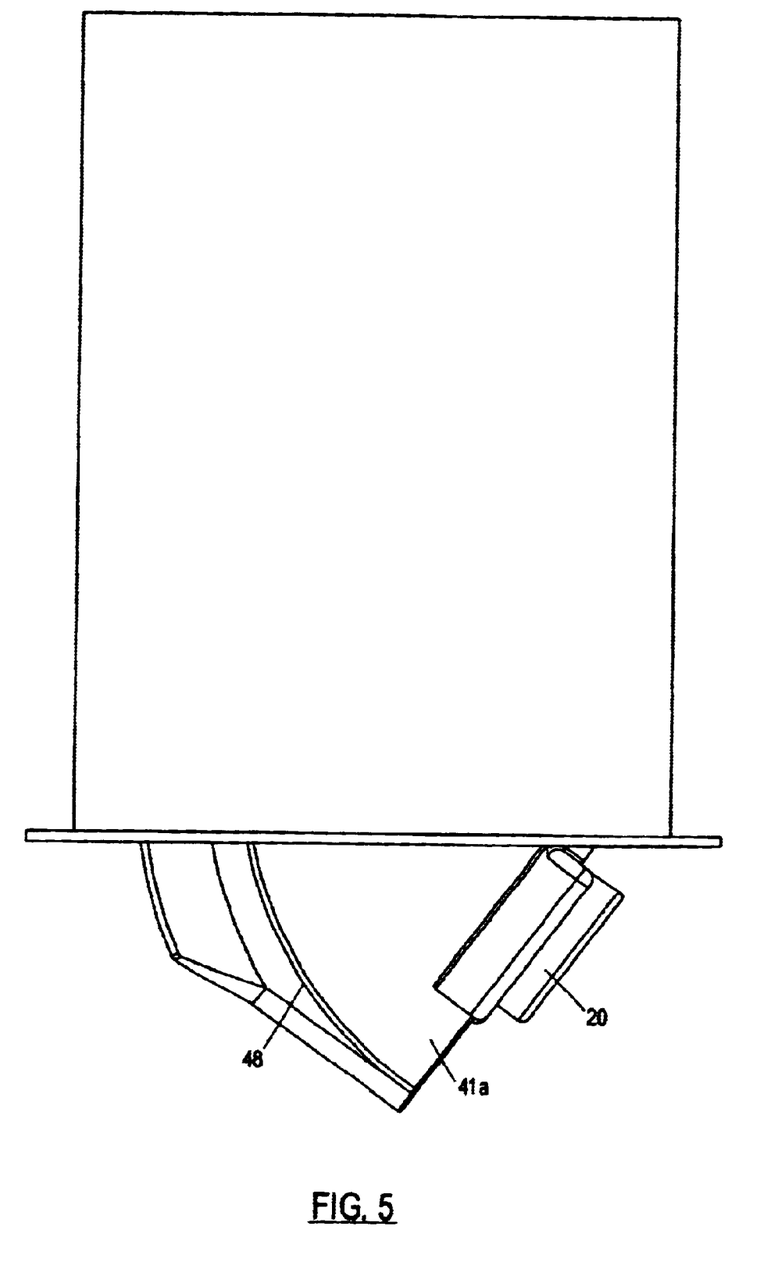
FIG. 5 is an opposite side view of FIG. 4.
Figure 6:
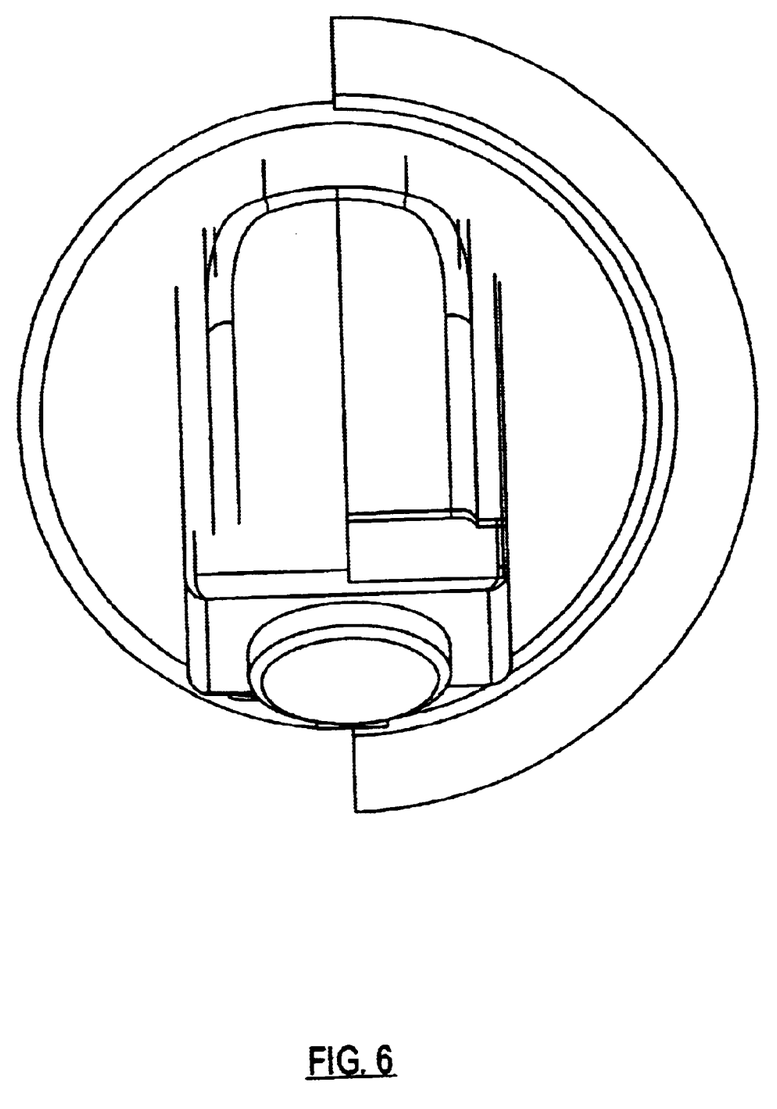
FIG. 6 is a partially cut away bottom view of the present invention.
Figure 7:
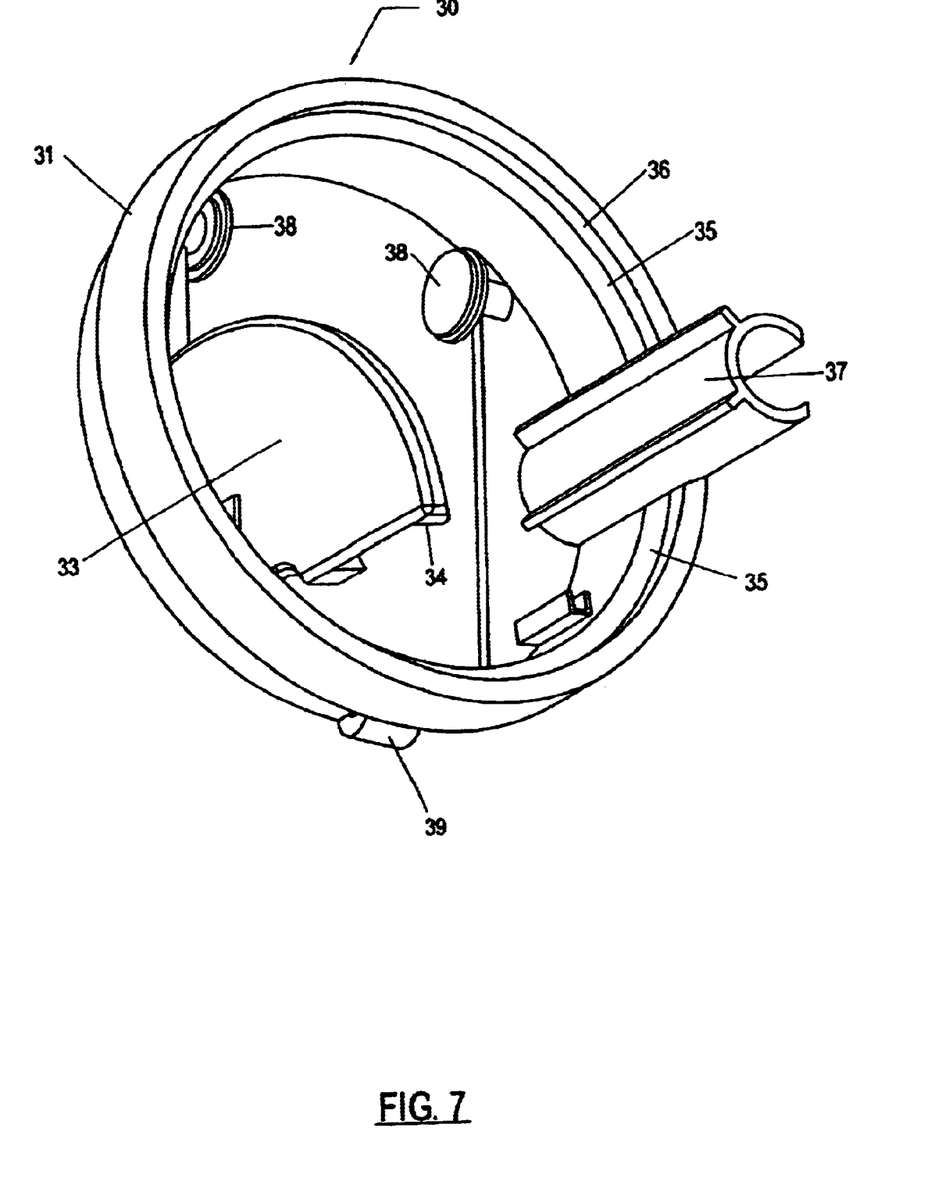
FIG. 7 is a detail perspective view of the pan and tilt gears of the present invention.
Figure 8:
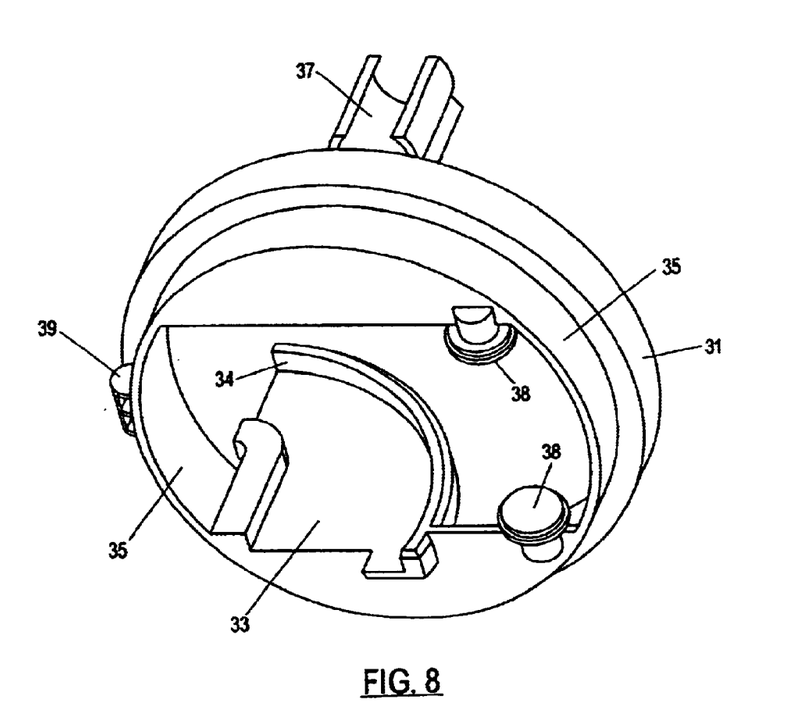
FIG. 8 is a another detail perspective view of the pan and tilt gears of the present invention.
Figure 9:
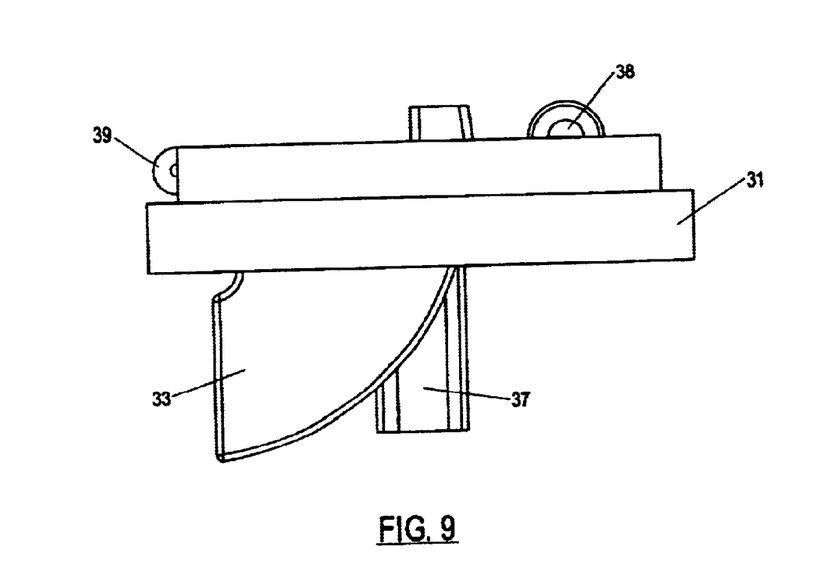
FIG. 9 is a detail side view of the internal tilt apparatus of the present invention.
Figure 10:
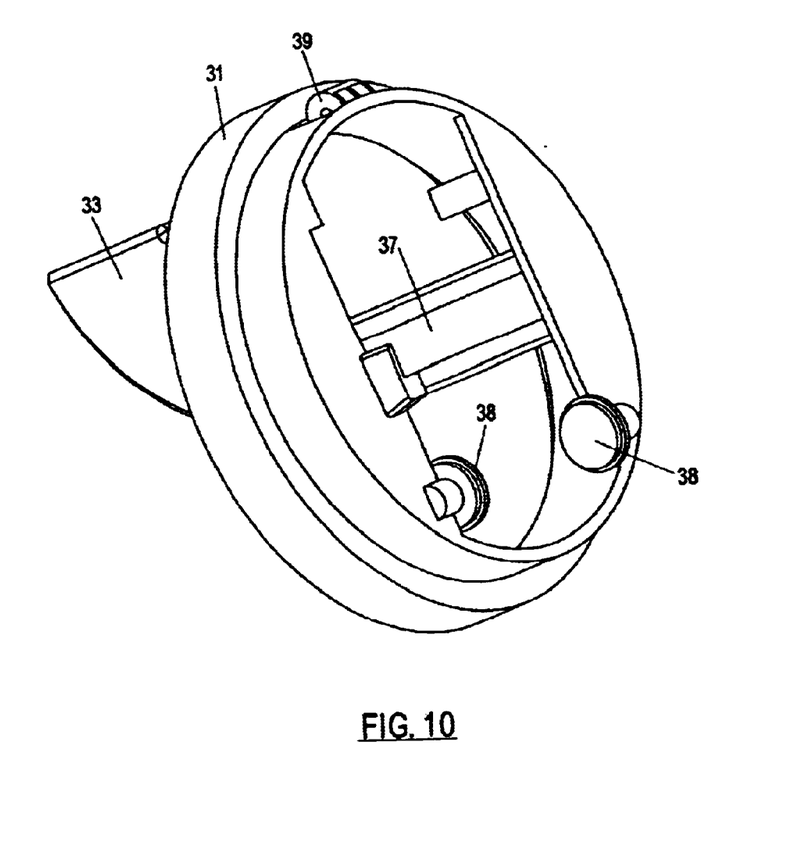
FIG. 10 is another detail perspective view of the pan and tilt gears of the present invention.
Figure 11:
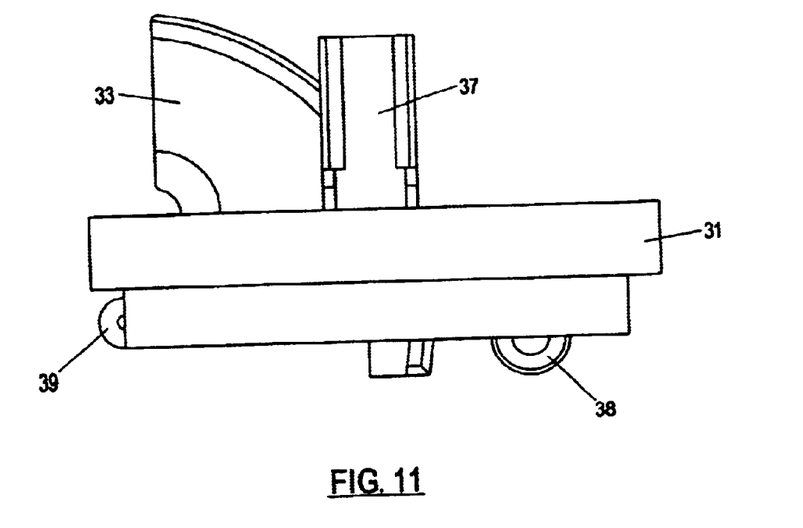
FIG. 11 is a detail opposite side view of the internal tilt apparatus of FIG. 9.
Figure 12:
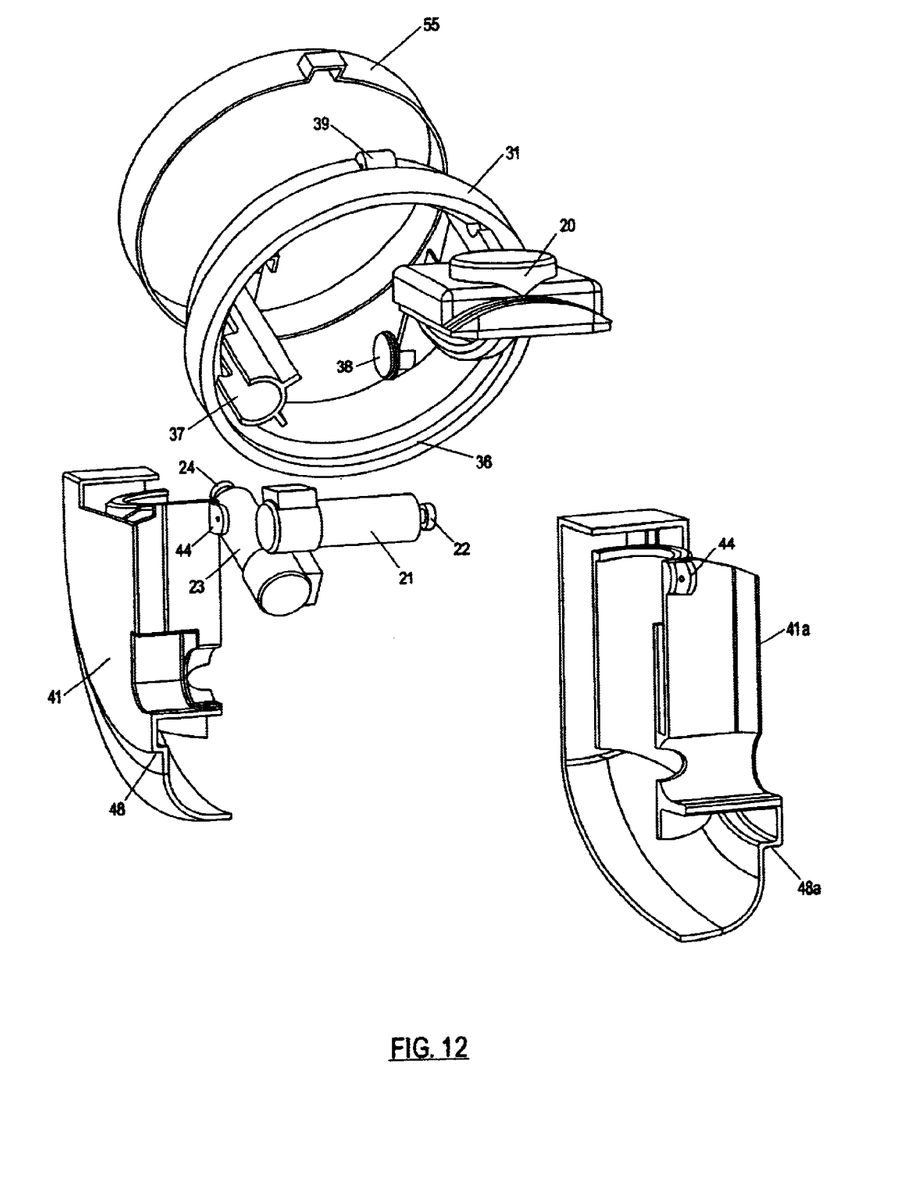
FIG. 12 is a detail exploded view of the internal pan and tilt mechanism of the present invention.

Referring to the detail of FIGS. 7–12, it is seen that annular bearing assembly 35 includes a pivot point 39. When assembled around camera 25, housing 41 (shown in exploded view of FIG. 12) includes a tab 44 for pivotal engagement with pivot 39 (see FIG. 7). Thus, housing 41 is supported by and pivots around point 39. Tilt motor 21 is attached to camera housing 41. An arcuate flange 33 in FIG. 10 having a gear surface 34 in FIG. 8 is provided on annular bearing assembly 35 for engagement with a corresponding gear 22 on tilt motor 21. Once gear 22 is engaged with surface 34, operation of tilt motor 21 causes housing 41 to move in an arcuate path around pivot 39. A pair of rotatable bearings 38 provide support for housing 41 along shoulders 48 in FIG. 12. Tilt motor 21 may be operated in either direction imparting motion to housing 41 and the camera 25 contained therein. The camera and housing are shown partially extended in FIG. 2, and fully retracted in FIG. 2A.

A support 37 for the pan motor 23 is also provided as shown in FIG. 7. Support 37 is attached to annular bearing assembly 35 that is, in turn, attached to flange 33 and gear surface 34. Support 37, annular bearing assembly 35, and flange 33 with gear surface 34 may be integrally attached to each other, or may be formed in a single injection molded part. Ball bearings are provided between annular bracket 31 and annular bearing assembly 35, allowing, assembly 35 to rotate freely inside, bracket 31. Annular bracket 31 remains in a fixed position in back box 51. Around the internal circumferential edge of annular bracket 31 a second gear surface 36 is provided for engagement with a corresponding gear 24 on pan motor 23. Operation of pan motor 23 causes annular bearing assembly 35 to move relative to annular bracket 31, thereby imparting rotational movement to assembly 35 as well as the camera 25 and other parts attached thereto.

The amount of tilt or retraction of the camera is affected by tilt motor 21. The control for motor 21 is correlated with the specific optics and zoom capabilities of the camera 25 so that the angle of tilt (the amount of extension or retraction) provided to camera 25 by motor 21 is varied according to the use of camera 25. For example, if it is desired that camera 25 maintain one edge of the viewing area along the ceiling line, as camera 25 is zoomed in and out, the tilt angle (i.e. the amount of extension or retraction) is varied using motor 21 according to the amount of zoom of camera 25 so as to keep one edge along the ceiling line.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

What is claimed is:

1. A mounting apparatus for a surveillance camera comprising an annular bearing assembly for installation adjacent to an opening in a planar surface, a camera support pivotally attached to said bearing assembly at a pivot point above said planar surface, a first motor for imparting pivotal movement to said camera support such that said camera support may be extended below said planar surface through said opening, and may be fully retracted through said opening to a position above said planar surface.

2. The mounting apparatus of claim 1 wherein said annular bearing assembly is rotatably provided inside an annular bracket attached around said opening, and a second motor is provided for imparting rotational movement to said annular bearing assembly and the camera support attached thereto.

3. The mounting apparatus of claim 1 wherein the viewing angle of said camera relative to said pivot is adjusted according to the optics of the lenses of said camera.

4. The mounting apparatus of claim 3 wherein the viewing angle of said camera relative to said pivot is adjusted in real time according to the telephoto capability and the presently adjusted telephoto focus of the lenses of said camera.

5. The mounting apparatus of claim 3 wherein the viewing angle of said camera relative to said pivot is adjusted in real time according to zoom capability and the presently adjusted amount of zoom of the lenses of said camera.

6. The mounting apparatus of claim 2 wherein a deformable transparent protective cover is provided over the camera opening in the planar surface.

7. The mounting apparatus of claim 2 wherein a deformable protective cover having at least one closable slit is provided over the camera opening in the planar surface.

8. The mounting apparatus of claim 2 wherein a fixed dome bubble is provided over said camera opening in the planar surface.

9. The mounting apparatus of claim 2 wherein a movable dome bubble is provided over said camera opening in the planar surface.

10. The mounting apparatus of claim 2 wherein said camera support is capable of pivoting in a range from zero degrees at full retraction to about 90 degrees at full extension.

\* \* \* \* \*